United States Patent [19]
Deschenes

[11] 3,832,014
[45] Aug. 27, 1974

[54] VARIABLE LOAD BRAKE APPARATUS
[75] Inventor: Roger Deschenes, Montfermeil, France
[73] Assignee: Wabco Westinghouse, Freinville-Sevran, France
[22] Filed: Sept. 4, 1973
[21] Appl. No.: 394,253

[52] U.S. Cl............................. 303/22 R, 188/195
[51] Int. Cl............................................. B60t 8/18
[58] Field of Search......... 303/22 R, 22 A, 6 C, 40, 303/7, 23; 188/195

[56] References Cited
UNITED STATES PATENTS

| | | | |
|---|---|---|---|
| 2,482,246 | 9/1949 | Cook et al. | 303/22 R |
| 2,501,713 | 3/1950 | Cook | 303/22 R |
| 2,515,963 | 7/1950 | McClure | 303/22 R |
| 2,528,143 | 10/1950 | Hewitt | 303/22 R |
| 2,690,932 | 10/1954 | Thomas | 303/22 R |
| 3,341,258 | 9/1967 | Dobrikin et al. | 303/22 R |
| 3,376,080 | 4/1968 | Kettering et al. | 188/195 |
| 3,606,485 | 9/1971 | Scott | 303/22 R |
| 3,692,365 | 9/1972 | Demarez | 303/22 R |
| 3,770,329 | 11/1973 | Oshida et al. | 303/22 R |

Primary Examiner—Trygve M. Blix
Assistant Examiner—D. C. Butler
Attorney, Agent, or Firm—W. F. Poore; Ralph W. McIntire, Jr.

[57] ABSTRACT

A device suitable for providing a fluid pressure as a function of two modulating factors. This device is more precisely of the type simultaneously assuring the generation of a force under the effect of an inlet pressure constituting the first factor and acting on a piston, and assuring the modulation of this force as a function of the second factor consisting of lever arms of varying length and the use of this modulated force to activate a supply and release valve device providing a pressure proportional to the value of the modulated force.

This invention is particularly applicable to an air brake equipment having a load compensating valve device that provides a brake cylinder pressure that is a function of the load on the vehicle involved.

23 Claims, 5 Drawing Figures

PATENTED AUG 27 1974  3,832,014

1

VARIABLE LOAD BRAKE APPARATUS

BACKGROUND OF THE INVENTION

The air brake load compensating valve devices usually used for road or railroad vehicles generally include a drive piston and a mechanical unit for transmitting force to levers which activate a valve device. These levers are connected mechanically to a reaction piston. The drive piston is subjected to the action of an inlet air pressure, thereby producing a driving force which is transmitted to the levers of the mechanical unit. These levers may be moved with respect to the drive and the reaction piston and have a power transmission ratio that varies as a function of the load, which modulates the "piloting" or driving force. The driving force is transmitted by the mechanical unit to the supply and release valve device, which is placed between a compressed air reservoir and braking cylinders or relays, to effect opening of the inlet valve of this valve device. This provides an outlet air pressure acting on the reaction piston in order to subject it to a reaction force which is transmitted to the drive piston by means of the mechanical unit so as to oppose the modulated driving force and to balance it when the outlet pressure has reached a sufficient value.

A load compensating valve device of this typs has the disadvantage of being complicated, expensive, space-consuming and heavy, and often of limited sensitivity unless large sections and diaphragms are used for the drive and reaction pistons.

SUMMARY OF THE INVENTION

The present invention is concerned with simplifying the fluid pressure operated load compensating valve devices and joining at least one of the drive and reaction pistons to a part of the mechanical power transmission and modulation unit.

Towards this objective, the fluid pressure operated load compensating valve device constituting the present invention contains th following items in one body: a drive piston subjected to a driving force exerted on it by the inlet pressure, a mechanical transmission having a pair of levers with a movable member dependent upon a modulation factor disposed therebetween, a supply and release valve device which - positioned between a source of pressure and a brake cylinder device - furnishes an outlet pressure effectively proportional to a control force itself proportional to the driving force and dependent upon the factor in question. The latter control force is applied by means of a mechanical transmission unit to a reaction piston which is subjected to the outlet pressure in a direction opposite the control force and which cooperates mechanically with the inlet and outlet valve of the valve device. The above-mentioned fluid pressure operated load compensating valve drive constituting the present invention is characterized by the fact that at least one of the drive or reaction pistons comprises a diaphragm having secured to its opposite sides a pair of diaphragm follower plates that act as a lever of the mechanical power transmission unit which, in the operating position, comes into contact on one side with a fixed or adjustable fulcrum and on the other side with a support movable according to load. One of the fulcrums is situated in a first chamber subjected to the inlet pressure and is the fulcrum for the drive piston. This support may be fixed or adjustable relative to the body. The other of these fulcrums is disposed in a second chamber subjected to the outlet pressure and is the fulcrum for the reaction piston.

In the case where the compensating valve device is applied to th braking of a vehicle, the modulation factor may consist of any combination whatsoever of the load, the velocity, the deceleration, and the adhesion of the vehicle. Each fulcrum and the movable support may consist of a rod or one or several rollers or balls, depending on the degree of freedom or the hyperstatic factor chosen for the power transmission unit.

When the drive piston is a diaphgram secured to two follower plates to form a lever of the power transmission unit, it thus jointly assumes the function of receiving a driving force produced by the inlet pressure and the function of a lever transmitting the driving force to the movable support.

When the reaction piston is a diaphragm secured to two follower plates to form a lever of the mechanical power transmission unit, it jointly assumes the function of receiving a reaction force produced by the outlet pressure and that of a lever transmitting the reaction force to the movable support.

When the drive and reaction pistons each constitute a diaphragm secured to two follower plates to form a lever that is part of the mechanical power transmission and transformation unit, they can be effectively arranged parallel and the movable support may constitute the only power transmission device placed between the two pistons. In this case, the movable support is placed in a chamber formed between the diaphragm of the drive and reaction pistons and is supported on one side of one follower of the diaphragm forming the drive piston and on the other side on one follower of the diaphragm forming a reaction piston so as to form a device for the transmission of compression forces between the two pistons.

According to one embodiment of the invention, at least one of the pistons is made up of a flexible diaphragm connected on its periphery in an essentially airtight manner to the body of a relay valve device. Its central part is connected to one or several relatively rigid plates which make up that part of the piston capable of coming into contact on one side with the fixed or adjustable fulcrum and on the other side with the movable support. Due to the drive and reaction pistons each comprising a flexible diaphragm they are thus very sensitive to the slightest variations in the respective inlet or outlet pressure of the supply and release valve device, while remaining sufficiently rigid to be used as power transmission levers in contact with the fixed fulcrum and the movable support. In effect, the flexible diaphragm permits the providing of asymmetric lateral clearances for the drive and reaction pistons, which are placed transversally in the body in the manner of a rotating blade held by the annular elastic diaphragm of the flexible membrane.

In order to simplify the construction of the supply and release valve device, a part of the diaphragm of the reaction piston may constitute in itself the outlet valve seat for the supply valve of this valve device. The outlet channel of the supply and release valve device in the direction of the discharge may be positioned either in the outlet valve itself or across the flexible diaphragm and/or the rigid wall of the reaction piston.

According to another embodiment of the invention, the displacement of the support movable according to load is essentially rectilinear. This arrangement makes it possible to control the movement of this movable support by connecting it to a movable piston in a bore. Various embodiments of the movable support may thus be realized according to the invention. In one of the embodiments, the movable support is made up of a rod housed in an intermediate chamber between the pistons, jointed to an adjustment device with respect to which it is capable of providing a clearance in a plane perpendicular to the plane of the drive and reaction pistons. This rod has a head housed in the intermediate chamber and protrudes with respect to the diameter of the rod to form the movable support between the drive and the reaction pistons.

In another form of embodiment, the movable support is made up of at least one ball or roller which is enclosed in a bore provided in an adjustment rod and which is free to move in the bore in a direction essentially perpendicular to the planes of the pistons. It is thus possible to provide for longitudinal guiding of the adjustment rod, which moves with more precision in an adjustment plane.

According to another embodiment characteristic of the present invention, the middle support points of the drive piston and of the reaction piston, on the fixed fulcrum and the movable support respectively, are essentially situated in the same working or operating plane effectively perpendicular to the drive and reaction pistons. This operating plane also contains the axis of the clack valve of the supply and release valve device and the displacement axis of the movable support.

The middle support points and the axis of the inlet valve are positioned in the operating plane in the following manner: the axis of the inlet clack valve is situated on one side of the reaction piston rod while the fixed fulcrums are situated on the other side of the reaction piston rod. The movable support is capable of moving in an area including the space between the fixed fulcrum that is closest to the reaction piston and the edge of the reaction piston, or to the drive piston respectively, on the side opposite the fixed fulcrums.

This particular arrangement of the support points with respect to the drive and reaction pistons makes it possible to eliminate all the lateral rotating reactions of the pistons and to activate the clack valve of the supply and release valve device by effectively operating in the axis of the latter and without running the risk of having it coincide in its guiding bores.

According to a type of embodiment particularly adapted to using the device according to the invention as a load compensating valve device in a braking system, the fixed fulcrum of the drive piston is further from the reaction piston rod than the fixed fulcrum of the reaction piston. This arrangement of the fixed fulcrums with respect to the reaction piston rod makes it possible for the device according to the invention to provide an outlet pressure which is always less than the inlet pressure. The latter situation makes it possible, for example, to use the inlet pressure as a source of pressure for supplying the supply and release valve device, and this arrangement is particularly suitable in the airbraking of vehicles since the relatively high inlet pressure is generally used as a direct braking pressure for an axle of small displacement such as the front axle of the vehicle.

The diameters of the drive and reaction pistons should preferably by symmetrical with respect to the operating plane previously defined, but they may be of any shape whatsoever: circular and/or oval, coaxial or identical.

According to one type of embodiment of the movable support, this is integral with a piston subjected to an adjustment pressure acting on the latter piston in opposition to a calibrated return spring and, upon applying the arrangement according to the invention to the braking of vehicles, the inlet pressure consists of a vehicle braking-control pressure and the operating devices subjected to the outlet pressure consist of direct or indirect braking power generators, the movable support being displaced in the intermediary chamber as a function of the load of the vehicle by means of a control device.

According to another characteristic of the invention, an inshot valve is disposed in a conduit that connects a first chamber subject to the inlet pressure and an intermediate chamber that is between the drive and reaction pistons. This inshot valve, which is operatively responsive to the operating pressure, is capable of cutting off this communication when the inlet pressure reaches a specific value or when the reaction piston is permanently subjected to the effect of at least one spring acting on it in the opening direction of the inlet valve of the supply and release valve device so that the outlet pressure of this valve device is increased by the effect of the pressure established by the inshot valve.

This embodiment of the invention permits the use, at little cost, of a load compensating valve device furnishing an inshot pressure equal to the inlet pressure up to a value of the inlet pressure sufficint to apply the brake shoes of a vehicle to the surface of the corresponding brake tracks.

The arrangement where the reaction piston is subjected only to the spring effect of an inshot valve represents a considerable simplification of all the known inshot valve devices, while making it possible to obtain - at the outlet of the load compensating valve device - an effective inshot pressure which increases with the load on the vehicle. The latter embodiment of the invention is more particularly adaptable to the case where the pressure source consists of the inlet pressure since, in the case where the inlet pressure is eliminated, the inshot valve pressure also disappears. In order to facilitate exhausting of the inshot valve pressure after elimination of the inlet pressure, the inlet and outlet valves contain an annular section subjected to the outlet pressure in a direction tending to connect the second chamber (subjected to the outlet pressure) to the pressure source consisting of the inlet pressure. On the other hand, the second chamber (subjected to the outlet pressure) may be connected to the pressure source by means of a nonreturn valve placed in a channel mounted in parallel with the supply valve and opening in the direction of flow from the second chamber toward the pressure source, so as to permit the escape, in each case, of the inshot valve pressure in the inlet pressure circuit when this is allowed to escape.

These embodiments of the arrangement according to the invention make it possible to use one or several compression springs for the inshot valve spring. These are housed in the intermediate chamber and positioned on the side of the diaphragm opposite the supply and release valve device, the intermediate chamber being permanently connected to the atmosphere.

According to other characteristics pertaining to the practical embodiment of the load compensating valve device, the load control apparatus consists, in a manner known in itself, of a piston subjected to an adjustment pressure which is a function of the load of the vehicle acting against a calibrated spring positioned around an adjustment rod connected to the movable support. The adjustment rod and the calibrated spring are placed in a chamber isolated from the outside and joining with the intermediate chamber, which is connected to the exhaust by means of a device providing protection against the entrance of external contamination (such as a filter or wasp excluder at the exhaust).

The load control device is located on one side of the supply and release valve device in the case where the adjustment pressure, which is a function of the load, diminishes when the load of the vehicle increases; it is located on the other side opposite the supply and release valve device in the case where the adjustment pressure, which is a function of the load, increases when the load of the vehicle increases.

The fixed or adjustable fulcrums can be located on both or opposite sides of the support movable according to load which thus, no matter what its displacement, approaches one of the fixed supports while it moves away from the other. Such an arrangement makes it possible to use the load compensating valve device both as a means to decrease and increase the inlet pressure according to the position of the movable support with respect to the fixed fulcrums and with respect to the drive and reaction piston rods. The position of the movable support may vary as a function of the adjustment factor where adjustment is achieved by means of mechanical drive as well as by means of pressurized or electric fluid drive.

The description that follows, in regard to the attached drawing, will clearly explain how the invention may be applied in practice, what its other characteristics are, and what the other results are which may be achieved by means of this invention.

DESCRIPTION

Figure 1:
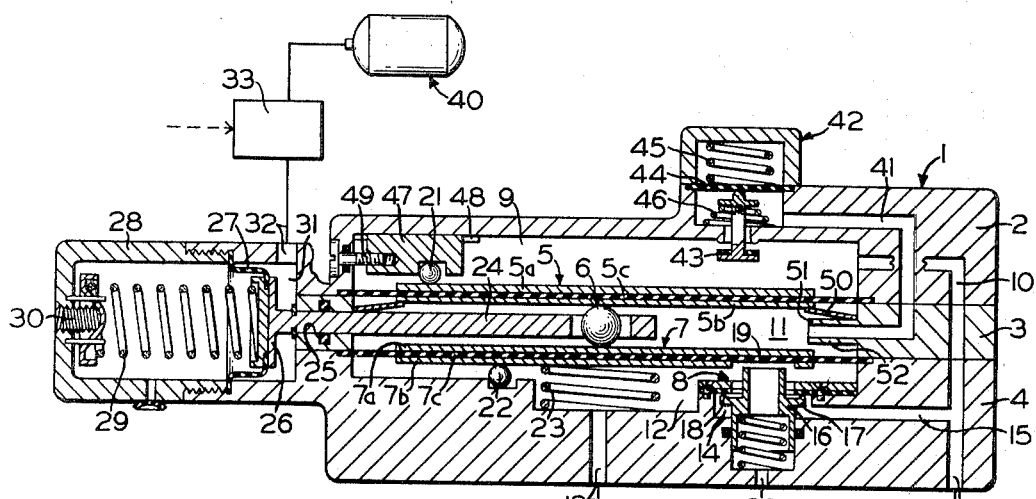
FIG. 1 is a diagrammatic view, partly in outline and partly in section, of a variable load brake equipment that comprises a load compensating valve device constructed in accordance with a first embodiment of the invention.

The load compensating valve device of the brake equipment illustrated in the figures includes a selectionalized body 1 with a hollowed out internal cavity. Body 1 of the load compensating valve device shown in FIG. 1 is a result of the airtight superimposing of the three parts or casing sections 2, 3, and 4 which together border and mark off the internal cavities housing a drive or operating piston 5, a movable support member or roller 6, a reaction piston 7, and a supply and release valve device or mechanism 8.

Drive piston 5 is made up of two diaphragm follower plates 5a and 5b, secured to the opposite sides of a flexible diaphragm 5c having its outer periphery clamped between parts or casing sections 2 and 3 of the body. Likewise, reaction piston 7 is made up of two diaphragm follower plates 7a and 7b, secured to the opposite sides of a flexible diaphragm 7c having its outer periphery clamped between parts or casing sections 3 and 4 of the body. The diaphragm follower plates are made of a metal that is simultaneously light, hard, and quite rigid upon bending, such as sheet metal, or a suitable plastic material.

Figure 4:
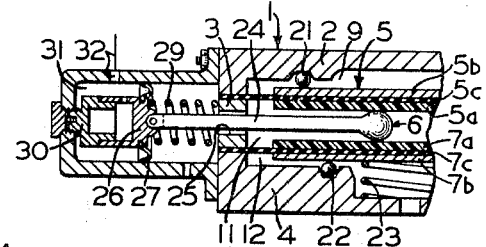
FIG. 4 is a partial view of a load compensating valve device constructed in accordance with a fourth embodiment of the invention.

The drive and reaction pistons 5 and 7 divide the interior cavity of the body 1 into a drive or operating chamber 9 connected to an operating pressure source via a passageway and corresponding numbered pipe 10, an intermediate chamber 11, connected either to the exhaust as indicated in FIG. 4 or to the drive chamber 9, as indicated in FIG. 1, via an inshot valve device hereinafter described, and a reaction chamber 12 connected by a passageway and correspondingly numbered pipe 13 to such as a a brake cylinder or relay valve device that is to be supplied with fluid under pressure to effect a brake application.

Supply and release valve device 8 is positioned between reaction chamber 12 and a supply chamber 14 connected to a compressed air source by a passageway 15. This valve device 8 is made up of a hollow double clack valve 16 capable of sliding in an airtight fashion in a bore in part 4. Double clack valve 16 has integral therewith an annular shoulder or outturned flange 17 which forms the inlet of supply valve of the valve device 8 and cooperates with a valve seat 18 in the form of a thin annular resilient plate secured to part or casing section 4 so as to be rigid therewith. One of the ends of the hollow double clack valve 16 constitutes the seat for escape or exhaust valve 19, itself formed by diaphragm 7c of the reaction piston 7 by the provision of a bore in plate 7b. The other end of the double clack valve 16 is in communication with the atmosphere via a passageway 20 and serves as a support for a closing spring of the inlet valve.

The drive piston 5 and the reaction piston 7 together with the diaphragm follower plates secured to their opposite sides, according to the invention, form the levers of a mechanical power transmission unit having a variable ratio, of which movable support 6 also forms a part.

In the operating position, the drive piston 5 is supported adjacent one end on one or a plurality of rollers or balls 21 held in casing section 2 in such a way that it protrudes into chamber 9. Likewise, the reaction piston 7 is supported in the operating position on one or a plurality of rollers or balls 22 held in casing section 4 and protruding into chamber 12. The reaction piston 7 in FIG. 1 is also supported on a spring 23, which effectively balances its weight.

Movable support 6 is made up of a roller or a ball (FIG. 1), or two rollers (FIG. 3) mounted loosely on a rod, or of the suitably rounded end of a rod (FIG. 4). In the types of embodiment shown in FIGS. 1 and 5, the ball (or roller) is capable of moving vertically in a bore provided in the adjustment rod 24, the bore acting as a cage to retain the ball therein.

Figure 5:
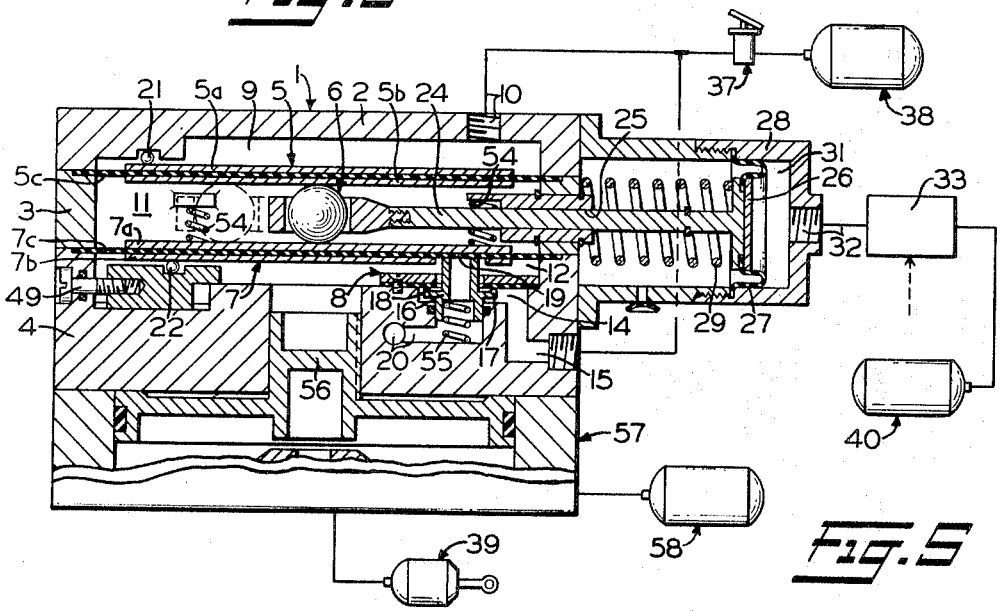
FIG. 5 is a diagrammatic view, partly in outline and partly in section, of a variable load brake equipment that comprises a load compensating valve device constructed in accordance with a fifth embodiment of the invention.

Rod 24, slides in an airtight fashion in a bore 25 provided in casing section 3 (FIG. 1) or may have a clearance of a certain amount with the wall of this bore 25 (FIG. 4). Rod 24, as shown in FIGS. 1 and 5, is in one piece with an abutment in the form of a piston 26 which may move in an airtight fashion by means of a rolling diaphragm 27 the outer periphery of which is clamped by a cylinder 28 attached to body 1. Piston 26 is brought back to the rest position by a biasing spring 29, whose calibration in the embodiment of the invention shown in FIGS. 1 and 4 may be adjusted by a screw or a screw nut 30. On the side opposite the spring 29, piston 26 cooperates with the body 1 to form a chamber 31 in communication via a passageway and correspondingly numbered pipe 32 with a feeding component, such as, for example an air spring 33, which furnishes an air pressure varying according to a certain factor, for example, according to the load on the vehicle on which the apparatus is mounted. It is obvious that adjustment rod 24 can be connected mechanically to a brake-gear whose displacement is produced by a variation in the relative position between an axle or unsprung part and the body or a sprung part of a vehicle. The pressure furnished by component 33 may also vary according to a factor consisting of any combination whatsoever of the load, the velocity, the deceleration, and the adhesion of the vehicle wheels to the roadway.

In FIGS. 1 and 5, the movable support 6 may be made up of a single ball housed in a cavity or bore in rod 24. The vertical clearance of the ball permits a rigid guiding of rod 24 in bore 25. The possible disadvantage of the ball sliding onto one of the associated surfaces of plates 5a and 7a is eliminated in the embodiment of the invention shown on FIG. 3, where support 6 is composed of two rollers 34 and 35 and where the support surface of plate 7a contains a tongue 36. Roller 34, smaller in diameter than the space between the plates, thus rolls without sliding on the lower surface of plate 5b; meanwhile roller 5, smaller in diameter than the distance between a tongue 36 and plate 5a, rolls without sliding on tongue 36.

As shown in FIG. 4, rod 24 may be smaller in diameter than bore 25 to provide clearances required by the almost vertical displacement of the ball-like end of this rod that constitutes support 6 for the piston 5. Rod 24 thus may extend through the bore 25 with clearance and is pivotally jointed to piston 26. The roller-path of support 6 may consist of tracks attached to pistons 5 and 7 and made of a material with a low coefficient of friction. Chamber 31, in the arrangement shown in FIG. 4, is situated on the opposite side of the piston 26 from the position in which it is shown in FIG. 1. Adjustment screw 30 makes it possible to adjust one of the positions at the end of the travel of support 6.

The load compensating valve device represented in FIGS. 1 and 5 is mounted between a control cock or brake valve device 37, connected to a compressed air reservoir 38, and a brake cylinder 39 (FIG. 1) or a relay 57 (FIG. 5) for supplying air to the brake cylinder 39 (FIG. 5). Component 33 attached to chamber 31 of the fluid motor that controls the displacement of the rollers or ball comprising support member 6, is connected to a reservoir 40 and may consist of, for example, a load-weighing mechanism furnishing a pressure that essentially varies in a ratio inversely proportional to the load. Piston 26 and roller 6 are represented in FIGS. 1 and 5 in the position that they occupy for the maximum load when component 33 provides a minimal pressure. Movable support 6 is represented on FIG. 5 by broken lines in the position it occupies while the vehicle is empty.

The apparatus shown in FIG. 1 consists of an internal conduit 41 (which could, of course, consist of an external pipe), connecting drive chamber 9 to the intermediary chamber 11. An inshot valve device 42 is positioned in conduit 9 in such a fashion as to control the closing of a clack valve 43 capable of closing conduit 41 when the pressure therein exceeds an initial chosen value. Towards this objective, the inshot valve device 42 consists, in a fashion known in itself, of a piston or a diaphragm 44 forced by a spring 45 in one direction and by the pressure in conduit 41 in the other direction. After the compression of spring 45, which occurs as soon as the pressure in conduit 41 exceeds the initial chosen value, the displacement of piston 44 causes the closing of clack valve 43, by a return spring 46.

Roller 21 is mounted in a support 47 sliding in a groove 48 and adjustable by a screw 49. A spring 50, consisting of a Belleville ring or a cylindrical or conical helicoidal spring, is positioned in such a way as to relieve the rollers or balls constituting support 6 from the weight of piston 5 and to permit them to be moved easily when the pressure in chamber 31 varies.

A lug 51 limits the travel of piston 5 downwards and a lug 52 limits the course of piston 7 upwards.

Figure 2:
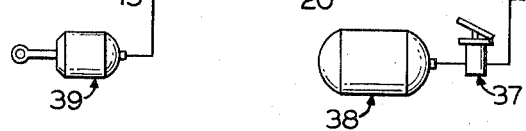
FIG. 2 is a partial view of the load compensating valve device shown in FIG. 1 showing how this valve device may be modified to provide a second embodiment of the invention.
Figure 2:
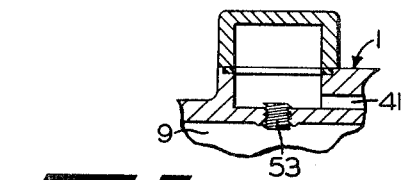

As shown in FIG. 2, a second embodiment of the invention is provided wherein the inshot valve device 42 of the load compensating device shown in FIG. 1 is eliminated and communication is permanently closed between the chamber 9 and the passageway 41 by a screw-threaded plug 53.

In the fifth embodiment of the invention shown in FIG. 5, the inshot valve device 42 shown in FIG. 1 eliminated and replaced by one or several springs 54 that are disposed in intermediary chamber 11 and interposed between casing section 3 of body 1 and plate 7a of piston 7. This spring or springs 54 act in a downward direction on piston 7 and in the direction tending to open supply valve 17. It should be noted that the strength of a spring 55 acting in the direction to seat inlet valve 17 on valve seat 18 is greater than the strength of the spring or springs 54 so that inlet valve 17 is normally closed.

However, when the piston 7, acting as a lever, is rocked clockwise about roller 22, acting as a fulcrum, by the force transmitted to piston 7 from the piston 5 via the support 6 as the diaphragm 5c is deflected downward, in response to the supply of fluid under pressure to the chamber 9 by manual operation of the brake valve 37, to unseat the inlet valve 17 from its seat 18, the spring or springs 54 will expand. Accordingly, it will be understood that the pressure built up in the chamber 12 in order for spring 55 to close inlet valve 17 must be such as to establish a fluid pressure force that is sufficient to balance the downwardly acting force transmitted to the piston 7 as the result of the supply of fluid under pressure to the chamber 9 and also recompress the spring or springs 54.

The fluid under pressure supplied to the chamber 12 acts on a piston 56 of a relay valve device 57 to operate this valve device to effect the supply of fluid under pressure from a supply reservoir 58 to the brake cylinder 39.

OPERATION

Operation of the first embodiment of the invention shown in FIG. 1 of the drawing will now be described.

It will be understood that the rollers or balls constituting movable support 6 and the rod 24 shown in FIG. 1 are in the position they occupy while the vehicle provided with the apparatus comprising the first embodiment of the invention is loaded to its maximum capacity.

Accordingly, when the brake valve 37 is manually operated, fluid under pressure is supplied from the reservoir 38 to the chamber 14, it being noted that the supply valve 17 is initially closed, and also the chamber 9 from whence it flows past the now open valve 43 and thence via the passage 41 to the intermediate chamber 11. The pressure on both sides of the operating piston 5 are thus substantially equal so that only the force produced by the fluid under pressure in the intermediate chamber 11 acting on the upper side of the diaphragm 7c is effective to establish a fluid pressure force that acts in a downward direction on the lever constituted by diaphragm 7c and the diaphragm follower plates 7a and 7b. Follower plate 7b rests on the roller 22 which acts as a fulcrum for this lever. Consequently, this lever is rocked clockwise about the roller 22 so that the diaphragm 7c is first deflected against the upper end of valve 16 to close communication between the brake cylinder 39 and atmosphere. Further clockwise rocking of this lever comprising the diaphragm plates 7a and 7b and diaphragm 7c effects opening of supply valve 17 of the supply and release valve device 8. Fluid under pressure then flows from the chamber 14 past the open valve 17 to the chamber 12 and thence to the brake cylinder 39 via passageway and pipe 13. The pressure thus quickly rises in the brake cylinder 39 and causes the brake linings to be applied to the brake drums or disks that rotate with the wheels of the vehicle.

It should be noted that during the entire period of time that the valve 43 of inshot valve device 42 remains open, the diaphragm follower plates 7a and 7b and diaphragm 7, which comprise the reaction piston 7, are allowed to act as a power transmission lever.

As soon as the value of the pressure in conduit 41 provided by the brake valve 37 has exceeded an initial chosen value determined by the calibration of spring 45 (FIG. 1), the diaphragm 44 is deflected upward and valve 43 closes. From then on, the pressure stops rising in chamber 11, but continues to rise in chamber 9, and piston 5 is subjected to an increasing fluid pressure force directed downwards and transmitted to the rollers or balls constituting support 6. It should be noted that the diaphragm follower plates 5a and 5b and the diaphragm 5c become a power transmission lever that is rocked counterclockwise about roller 21 when effecting a brake release. The pressure of the fluid required in chamber 12 to provide the torque necessary to balance the torque resulting from the force transmitted by the drive piston 5 to the rollers or balls constituting support 6 becomes greater as these rollers or balls are further away from roller 21. Conversely, the rollers or balls constituting support 6 transmit a resulting torque to piston 7 around roller 22 and as a consequence, the force transmitted to the double clack valve 16 is greater the further support 6 is from roller 22. The pressure delivered to the brake cylinder 39 thus increases up to a value at which the torque that it produces on the lever constituted by the plates 7a and 7b by reason of this pressure acting on the effective area of the diaphragm 7c of the reaction piston 7 as this lever pivoting on roller 22 balances the modulated torque transmitted to it by the rollers or balls forming the movable support 6.

When the vehicle equipped with the apparatus according to the first embodiment of the invention is empty, the pressure furnished by the inverse-pressure load-weighing mechanism 33 is maximum and the guiding rod 24 moves towards the left of FIG. 1.

Therefore, the support 6 is moved to a position closer to th roller 22. The apparatus constituting the first embodiment of the invention will now operate in the same manner as hereinbefore described. However, the pressure supplied to the brake cylinder 39 and the lower side of the diaphragm 7c until a sufficient fluid pressure force is developed to provide the torque necessary to balance the torque resulting from the force transmitted from diaphragm 5c via adjustable support member 6 will be less than required when the vehicle is fully loaded. Accordingly, the proper braking force for an empty vehicle will be provided.

From the foregoing it is apparent that the supplying of drive chamber 9 and of supply chamber 14 with fluid under pressure from the brake valve 37 produces a drive torque resulting from the force transmitted from drive piston 5, which is balanced by the reaction torque produced by fluid under pressure acting on the lower side of diaphragm 7c. This transmits an upward force to support 6. Since the distance between movable support 6 and fixed support 22 is less than the distance between movable support 6 and fixed support 21, the pressure supplied to reaction chamber 12 is a submultiple of the pressure supplied by the brake valve 37. It follows that the braking pressure of the empty vehicle is greatly reduced. It should be noted however, that the inshot valve device 42 provides an initial minimum brake cylinder pressure of constant value.

Furthermore, it is apparent that as movable support 6 approaches fixed support 22, the reduction of the braking pressure increases rapidly and the pressure supplied by the apparatus becomes zero when the center of movable support 6 is vertically above the center of fixed support 22.

While releasing the brakes, the pressure supplied by the brake valve 37 to chamber 9 diminishes. The pressure in chamber 12 then pushes reaction piston 7 upwards and puts double clack valve 16 in the discharge position until a new point of equilibrium has been obtained. The excape of the fluid under pressure supplied to the chamber 11 by the inshot valve device 42 takes place by back flow past valve 43 which is opened upon the release of the pressure in drive chamber 9 via the brake valve 37. The escape of the air under pressure from the brake cylinder 39 supplied thereto by the initial supply of air under pressure to the chamber 11 may also take place by connecting reaction chamber 12 to chamber 14 by means of a nonreturn clack valve (not shown) opening in the direction of chamber 14.

The exhausting of chamber 14 also permits a partial exhausting of the pressure in chamber 12 due to the effect of the pressure found in this chamber 12 which acts on the annular flange 17 constituting the supply valve of double clack valve 16. The exhaust channel of clack valve 16 may obviously go through reaction piston 7 in such a way that the pressurized fluid in chamber 12 may escape to the discharge through intermediate chamber 11, which is thus ventilated and protected against the entrance of contamination from outside.

The second embodiment of the invention may comprise the apparatus shown in FIG. 1 except the inshot valve device 42 of the load compensating valve device shown in FIG. 1 is omitted and the communication between the chamber 9 and the passageway 41 closed by means of the screw-threaded plug 53 shown in FIG. 2. The operation of this second embodiment of the invention is the same as that hereinbefore described for the first embodiment shown in FIG. 1 except that no fluid under pressure is supplied to the chamber 11 to provide an initial inshot of fluid under pressure to the brake cylinder 39.

Figure 3:
FIG. 3 is a cross-sectional view showing details of a movable support member that may be used in place of the movable support member of the load compensating valve device shown in FIG. 1 thereby providing a load compensating valve device constructed in accordance with a third embodiment of the invention.

The load compensating valve device constituting a part of the third embodiment of the invention differs from the load compensating valve device shown in FIG. 1 only in that the movable support 6 is constructed as shown in FIG. 3. The operation of the third embodiment of the invention is the same as that hereinbefore described and need not be repeated.

The apparatus constituting the fourth embodiment of the invention comprises a load compensating valve device constructed as shown in FIG. 4, it being understood that the construction of the part of the load compensating valve device not shown in FIG. 4 may be the same as that shown in FIG. 1 or the inshot valve device 42 may be omitted as shown in FIG. 2.

The load compensating valve shown in FIG. 4 is for use with a load-weighing mechanism that provides a pressure which varies directly proportional to the load.

Except as noted above regarding the operation of the load-weighing mechanism, the operation of a variable load brake apparatus comprising a load compensating valve device constructed as shown in FIG. 4 is the same as that hereinbefore described.

A fifth embodiment of the invention is shown in FIG. 5 of the drawings. It may be seen from FIG. 5 that intermediate chamber 11 may be separate from the chamber containing spring 29 acting on adjustment rod 24 via piston 26, which makes it possible to protect this spring from corrosion. The adjustment of the calibration of this spring 29 may be eliminated an replaced by the adjustment of the position of fixed supports 21 or 22 by means of an adjustment screw 49 shown for the support 22.

It is quite obvious that the load compensating valve device described in the several embodiments of the invention may be modified without exceeding the framework of the invention.

The driving fluid, the supply fluid, and the fluid for driving the adjustment rod 24 may consist of a gas or a liquid under pressure. The effective area of the reaction piston 7 may be different from the effective area of the drive piston 6. The case where the effective area of the reaction piston 7 is smaller than the effective area of the drive piston 5 is particularly applicable to the use of the pressure multiplying device. Rollers 21 and 22, instead of being placed on the same side of the movable support 6, may be located on opposite sides of this support. Roller 21 is thus mounted above support 6 as shown in FIGS. 1, 4 and 5 of the drawing, and the concavity of the curve representing the variation in the pressure coming from the apparatus as a function of the load is thus turned upwards. Rollers 21 and 22 may be made up of rods having a long length with respect to their diameter and the section of pistons 5 and 7 can be of any kind: circular, square, oval.

The load compensating valve device according to the invention can be used not only for regulating the braking pressure as a function of the load of a vehicle but also as a compensating relay valve device that may be continuously adjusted as a function of a continuously varying factor, or it can also be used as a pressure reducer relay of adjustable pressure provided with a definitive adjustment of the ratio between the inlet and the outlet pressure.

Having now described the invention what I claim as new and desire to secure by Letters Patent, is:

1. For use in a single pipe brake apparatus for a vehicle having a brake applying means and a manually operable means for effecting the supply of fluid under pressure to said pipe, a load compensating valve device for interposition in said pipe and operable responsively to variations of pressure of fluid in said pipe to control the degree of pressure established in said brake applying means to cause a brake application on the vehicle variable in degree according to the degree of load on the vehicle, said load compensating valve device comprising:

a. an adjustable support member,
 b. a bias abutment operable by fluid under pressure to move said support member to a position corresponding to the degree of load on the vehicle, wherein the improvement comprises;
 c. a first movable abutment disposed on one side of said adjustable support member and so constructed and arranged as to operate as a first lever rockable in ine direction, said abutment, when subject to the side thereof opposite said support member to fluid under pressure supplied from said manually operable means via said pipe, being effective to deflect in the direction to transmit a force to said support member,
 d. a second abutment disposed on the other side of said support member and so constructed and arranged as to operate as a second lever rockable in a direction opposite said one direction in response to the torque resulting from the force transmitted thereto from said first lever via said support member, and
 e. a supply and release valve mechanism operable, in response to rocking of said second lever in said direction opposite said one direction, to supply fluid under pressure to cause the brake applying means to effect a brake appplication on the vehicle and to the side of said second abutment opposite said support member to provide an increasing fluid pressure on the effective area of said side of said second abutment until said pressure establishes a fluid pressure force the resulting torque of which on said second lever is substantially equal in magnitude and opposite in direction to said torque, said resulting torque, and therefore said pressure, being variable in accordance with the position of said support member relative to said second lever, and said resulting torque being effective to rock said second lever in said one direction to enable said valve mechanism to cut off said supply of fluid under pressure, a subsequent reduction of the pressure of the fluid acting on said side of said first abutment rendering said second abutment effective by the fluid under pressure acting on the said side thereof to deflect in the direction to cause simultaneous operation of said valve mechanism to release the brake application and transmittal of a force via said support member to said first lever, the torque thus produced on said first lever by said force being effective to rock it in said one direction.

2. For use in a single pipe brake apparatus for a vehicle having a brake applying means and a manually operable means for effecting the supply of fluid under pressure to said pipe, a load compensating valve device for interposition in said pipe and operable resonsively to variations of pressure of fluid in said pipe to control the degree of pressure established in said brake applying means to cause a brake application on the vehicle variable in degree according to the degree of load on the vehicle, said load compensating valve device comprising:

a. a sectionalized casing having a plurality of casing sections, one of which is provided with a bore,
  b. a pair of fulcrums,
  c. spring means,
  d. a bias abutment subject to one side to said spring means and on the opposite side to a fluid pressure force variable directly in accordance with the load on the vehicle,
  e. a rod of such diameter as to extend with clearance through said bore in said one casing section, one end of said rod being pivotally connected to said bias abutment and the other end having formed integral therewith a spherical member, said clearance providing for limited movement of said rod and member relative to the wall surface of said bore,
  f. a first movable abutment comprising a first flexible diaphragm having its outer periphery clamped between said one casing section and another of said casing sections to form on the side thereof adjacent said another casing section a first chamber into which opens one end of said pipe, each side of the central portion of said first diaphgram being respectively secured to an adjacent side of one of a first pair of rigid plates, said first diaphragm and said first pair of plates constituting a first lever rockable in one direction about one of said fulcrums, said first diaphragm, upon the supply of fluid under pressure to said first chamber from said manually operable means via said pipe being effective to deflect in the direction to transmit a force to said spherical member,
  g. a second movable abutment comprising a second flexible diaphragm having its outer periphery clamped between said one casing section and a third casing section and cooperating respectively with said second diaphragm and said one casing section to form a second chamber and with said third casing section to form a third chamber, and spherical member being disposed in said second chamber so as to support thereon said first lever, each side of the central portion of said second diaphragm being respectively secured to an adjacent side of one of a second pair of rigid plates, said second diaphragm and said second pair of plates constituting a second lever for supporting thereon said spherical member, said second lever being rockable in a direction opposite said one direction about the other of said fulcrums in response to the torque resulting from the force transmitted thereto from and first lever via said spherical member, and h. a supply and release valve mechanism operable, in response to rocking of said second lever in said direction opposite said one direction, to supply fluid under pressure to cause the brake applying means to effect a brake application on the vehicle and to said third chamber to provide an increasing fluid pressure on the effective area of the adjacent side of said second abutment until said pressure establishes a fluid pressure force the resulting torque of which on said second lever is substantially equal in magnitude and opposite in direction to said torque, said resulting torque, and therefore, said pressure, being variable in accordance with the position of said spherical member relative to said second lever, and said resulting torque being effective to rock said second lever in said one direction to enable said valve mechanism to cut off said supply of fluid under pressure, a subsequent reduction of the pressure of the fluid in said first chamber rendering said second diaphragm effective, by the pressure of the fluid in said third chamber, to deflect in the direction to cause simultaneous operation of said valve mechanism to release the brake application and transmittal of a force via said spherical member to said first lever, the torque thus produced on said first lever by said force being effective to rock it in said one direction.

3. A load compensating valve device, as recited in claim 1, further characterized by a pair of fulcrums, about one of which said first lever is rocked in said one direction and about the other of which said second lever is rocked in said direction opposite said one direction, either one of said fulcrums being adjustable relative to its respective lever.

4. A load compensating valve device, as recited in claim 1, further characterized in that said valve mechanism comprises an exhaust valve, and said second movable abutment comprises a diaphragm that constitutes an exhaust valve seat for said exhaust valve.

5. A load compensating valve device, as recited in claim 1, further characterized by a sectionalized casing comprising a plurality of casing sections, and said abutments cooperate with said sectionalized casing to form a sealed fluid pressure receiving chamber enclosing therein said adjustable support member in abutting relationship with each of said abutments whereby said adjustable support member is effective to transmit a fluid pressure force acting on either of said abutments to the other abutment.

6. A load compensating valve device, as recited in claim 3, further characterized in that said adjustable support member and each of said fulcrums comprise roller means.

7. A load compensating valve device, as recited in claim 3, further characterized in that said support member and each of said fulcrums comprise ball means.

8. A load compensating valve device, as recited in claim 3, further characterized by a sectionalized casing comprising a plurality of casing sections, and at least one of said movable abutments comprises a flexible diaphragm having its periphery clamped between a pair of said casing sections, each side of the central portion of said diaphragm being respectively secured to an adjacent side of one of a pair of rigid plates, said diaphragm and plates thereby forming one of said levers whereby the rigid plate on the side of said diaphragm adjacent the fulcrum for the one lever abuts this fulcrum and the other side of the one lever abuts said adjustable support member.

9. A load compensating valve device, as recited in claim 3, further characterized in that said valve mechanism comprises an exhaust valve, and one of said second pair of rigid plates being disposed on the side of said second diaphragm adjacent said exhaust valve and having therein an opening that is coaxial with said exhaust valve thereby enabling said diaphragm to constitute a resilient exhaust valve seat for said exhaust valve, said valve seat being movable to close said valve upon initial rocking of said second lever about said other fulcrum in said direction opposite said one direction.

10. A load compensating valve device, as recited in claim 5, further characterized in that said adjustable support member comprises:
 a. a rod having one end extending to the exterior of said sealed fluid pressure receiving chamber and secured to said bias abutment, the remainder of said rod being disposed in said chamber and having adjacent its opposite end an opening therein, and
 b. roller means disposed in said opening in said rod and movable therein in the direction of each of said movable abutments.

11. A load compensating valve device, as recited in claim 5, further characterized in that said adjustable support member comprises:
 a. a rod having one end extending to the exterior of said sealed fluid pressure receiving chamber and integral with said bias abutment, said abutment being subject on one side to a fluid pressure force inversely proportional to the load on the vehicle, and
 b. a spring disposed on the other side of said bias abutment to yieldingly resist movement of said abutment by said fluid pressure force.

12. A load compensating valve device, as recited in claim 10, further characterized in that the points of contact of each of said levers with said adjustable support member and the fulcrum for the respective lever, the axis of said rod and the axis of said supply and release valve mechanism all lie in a common plane.

13. A load compensating valve device, as recited in claim 12, further characterized in that the axis of said supply and release valve mechanism is disposed on one side of the point of contact of each lever with said adjustable support, and the point of contact of each of said levers with its fulcrum is disposed on the opposite side of the point of contact of the respective lever with said adjustable support.

14. A load compensating valve device, as recited in claim 12, further characterized in that the point of contact of said first lever with its fulcrum is further from the point of contact of this first lever with said adjustable support member than the point of contact of said second lever with its fulcrum is from the point of contact of this second lever with said adjustable support.

15. A load compensating valve device, as recited in claim 12, further characterized in that the movable aubtment operable as one of said levers constitutes a flat diaphragm oval in shape and having a major axis lying in said common plane.

16. A load compensating valve device, as recited in claim 12, further characterized in that the movable abutment operable as said first lever or the movable abutment operable as said second lever constitutes a flat circular diaphragm.

17. A load compensating valve device, as recited in claim 16, further characterized in that said circular diaphragms are arranged in coaxial relationship.

18. A load compensating valve device, as recited in claim 16, further characterized in that said flat diaphragms are of equal thickness.

19. For use in a single pipe brake apparatus for a vehicle having a brake applying means and a manually operable means for effecting the supply of fluid under pressure to said pipe, a load compensating valve device for interposition in said pipe and operable responsively to variations of pressure of fluid in said pipe to control the degree of pressure established in said brake applying means to cause a brake application on the vehicle variable in degree according to the degree of load on the vehicle, said load compensating valve device comprising:
 a. a sectionalized casing having a plurality of casing sections, wherein the improvement comprises:
 b. a first movable abutment comprising a first flexible abutment having its outer periphery clamped between a pair of said casing sections and cooperating with one of said pair of casing sections to form on the side thereof adjacent said one casing section a first chamber into which opens one end of said pipe, each side of the central portion of said first diaphragm being respectively secured to an adjacent side of one of a first pair of rigid plates, said first diaphragm and said first pair of plates constituting a first lever rockable in one direction, said first diaphragm, upon the supply of fluid under pressure to said first chamber from said manually operable means via said pipe, being effective to deflect in one direction,
 c. second movable abutment comprising a second flexible diaphragm having its outer periphery clamped between the other of said pair of casing sections and a third casing section and cooperating respectively with said first diaphragm and said other casing section to form a second chamber between said first and second diaphragms and with said third casing section to form a third chamber, each side of the central portion of said second diaphragm being respectively secured to an adjacent side of one of a second pair of rigid plates, said second diaphragm and said second pair of plates constituting a second lever rockable in a direction opposite said one direction, said second diaphragm being effective to deflect in a direction opposite the direction of deflection of said first diaphragm in response to the pressure of the fluid in said third chamber exceeding the pressure of fluid in said first and second chambers, d. a conduit means connecting said first and second chambers, e. an adjustable support member so disposed in said second chamber as to support said first lever and be supported on said second lever whereby said deflection of said first diaphragm in said one direction transmits a force via said support member to said second lever the torque resulting from said force being effective to rock said second lever in said direction opposite said one direction, and said deflection of said second diaphragm in said direction opposite the deflection of said first diaphragm transmits a force via said support member to said first lever the torque resulting from said force being effective to rock said first lever in said one direction, f. a bias abutment operable by fluid under pressure to shift said support member to a position corresponding to the degree of load on the vehicle, g. limiting valve means disposed in said conduit means and operable by fluid under pressure flowing therethrough from said first to said second chamber to cut off flow to said second chamber upon the pressure therein reaching a chosen value whereby, prior to cut-off of flow of fluid under pressure to said second chamber, only the pressure in said second chamber and effective on the effective area of said second diaphragm is effective to deflect said diaphragm to provide a force the torque resulting therefrom being effective to rock said second lever in said direction opposite said one direction, and, subsequent to said cut off of flow of fluid under pressure, only a further increase of pressure in said first chamber and effective on the effective area of said first diaphragm, which effective area is different than the effective area of said second diaphragm, is effective to deflect said diaphragms to provide a force the torque resulting therefrom being effective to rock said second lever in said direction opposite said one direction, and h. a supply and releast valve mechanism operable, in response to rocking of said second lever in said direction opposite said one direction, to supply fluid under pressure to cause a brake application on the vehicle and to said third chamber to provide an increasing fluid pressure on the effective area of the adjacent side of said second abutment until said pressure establishes a fluid pressure force the resulting torque of which on said second lever is substantially equal in magnitude and opposite in direction to said torque, said resulting torque, and therefore, said pressure, being variable in accordance with the position of said adjustable support member relative to said second lever, and said resulting torque being effective to rock said second lever in said one direction to enable said valve mechanism to cut off said supply of fluid under pressure, a subsequent reduction of the pressure of the fluid in said first chamber rendering said second diaphragm effective, by the pressure of the fluid in said third chamber, to deflect in the direction to cause simultaneous operation of said valve mechanism to release the brake application and transmittal of a force via said support member to said first lever, the torque thus produced on said first lever by said force being effective to rock said first lever in said one direction.

20. For use in a single pipe brake apparatus for a vehicle having a brake applying means and a manually operable means for effecting the supply of fluid under pressure to said pipe, a load compensating valve device for interposition in said pipe and operable responsively to variations of pressure of fluid in said pipe to control the degree of pressure established in said brake applying means to cause a brake application on the vehicle in degree according to the degree of load on the vehicle, said load compensating valve device comprising:

a. a sectionalized casing having a plurality of casing sections, wherein the improvement comprises b. a first moveable abutment comprising a first flexible abutment having its outer periphery clamped between a pair of said casing sections and cooperating with one of said pair of casing sections to form on the side thereof adjacent said one casing section a first chamber into which opens one end of said pipe, each side of the central portion of said first diaphragm being respectively secured to an adjacent side of one of a first pair of rigid plates, said first diaphragm and said first pair of plates constituting a first lever rockable in one direction, said first diaphragm, upon the supply of fluid under pressure to said first chamber from said manually operable means via said pipe, being effective to deflect in one direction, c. a second movable abutment comprising a second flexible diaphragm having its outer periphery clamped between the other of said first pair of casing sections and a third casing section and cooperating respectively with said first diaphragm and said other casing section to form a second chamber between said first and second diaphragms and with said third casing section to form a third chamber, each side of the central portion of said second diaphragm being respectively secured to an adjacent side of one of a second pair of rigid plates, said second diaphragm and said second pair of plates constituting a second lever rockable in a direction opposite said one direction, said second diaphragm being effective to deflect in a direction opposite the direction of deflection of said first diaphragm in response to the pressure of the fluid in said third chamber exceeding the pressure of fluid in said first chamber, d. spring means interposed between said other of said pair of casing sections and said second lever and exerting a bias thereon to rock said second lever in said direction opposite said one direction, e. a fulcrum for each of said levers, f. a support member adjustable with respect to said fulcrums in accordance with the degree of load on the vehicle and so disposed in said second chamber as to support said first lever and be supported on said second lever whereby said deflection of said first diaphragm in said one direction transmits a force via said support member to said second lever the torque resulting from said force being effective to rock said second lever about one of said fulcrums in said direction opposite said one direction, and said deflection of said second diaphragm in said direction opposite the deflection of said first diaphragm transmits a force via said support member to said first diaphragm the torque resulting from said force being effective to rock said first lever about the other of said fulcrums in said one direction,
g. a bias abutment operable by fluid under pressure for shifting said adjustable support member relative to said levers and said fulcrums,
h. a fluid pressure operated relay valve means operable to supply fluid under pressure to said brake applying means, and
i. a supply and release valve device operable, in response to rocking of said second lever in said direction opposite said one direction, to effect the supply of fluid under pressure to said fluid pressure operated relay valve means to cause operation thereof to effect a brake application and to said third chamber to provide an increasing fluid pressure on the effective area of the adjacent side of said second abutment until said pressure establishes a fluid pressure force the resulting torque of which on said second lever is substantially equal in magnitude and opposite in direction to said torque, said resulting torque, and therefore, said pressure, being variable in accordance with the position of said adjustable support member relative to said fulcrums, and said resulting torque being effective to rock said second lever in said one direction to enable said valve device to cut off said supply of fluid under pressure, a subsequent reduction of the pressure of the fluid in said first chamber rendering said second diaphragm effective, by the pressure of the fluid in said third chamber, to deflect in the direction to cause simultaneous operation of said valve device to release fluid under pressure from said relay valve means to cause a release of the brake application and transmittal of a force via said support means to said first lever, the torque thus produced on said first lever by said force being effective to rock said first lever in said one direction.

21. A variable load brake apparatus, as recited in claim 20, further characterized in that said spring means is disposed in said second chamber, and said second chamber is constantly open to atmosphere.

22. A variable load brake apparatus, as recited in claim 20, further characterized by a rod connecting said bias abutment and said support member, and by a spring disposed about said rod and acting on one side of said abutment in opposition to fluid under pressure acting on the opposite side, said pressure being variable in degree inversely proportional to the load on the vehicle.

23. A variable load brake apparatus, as recited in claim 22, further characterized in that a second pair of casing sections of said sectionalized casing cooperate to form a hollow cylinder, and said bias abutment comprises a piston slidably disposed in said hollow cylinder and cooperating therewith to form on the respective opposite sides thereof a pair of chambers in one of which chambers is disposed said spring interposed between said piston and certain of said casing sections of said sectionalized casing, said one chamber being constantly open to atmosphere.

* * * * *

UNITED STATES PATENT OFFICE
CERTIFICATE OF CORRECTION

PATENT NO. : 3,832,014
DATED : Aug. 27, 1974
INVENTOR(S) : Roger Deschenes

It is certified that error appears in the above-identified patent and that said Letters Patent are hereby corrected as shown below.

Claim 1, line 20, "ine" should be --one--; "to" should be --on--; line 26, after "second" insert --movable--; line 55, after "deflect" insert --it--. Claim 2, line 16, "to", first occurrence, should read --on--; line 50, "and" should read --said--; line 62, "and", first occurrence, should read --said--. Claim 9, line 9, after "said", second occurrence, insert --exhaust--. Claim 15, line 3, "aubtment" should read --abutment--. Claim 19, line 29, after "c." insert --a--.

Signed and Sealed this twenty-sixth Day of August 1975

[SEAL]

Attest:

RUTH C. MASON
*Attesting Officer*

C. MARSHALL DANN
*Commissioner of Patents and Trademarks*